United States Patent
Yun et al.

(10) Patent No.: US 8,769,191 B2
(45) Date of Patent: Jul. 1, 2014

(54) GARBAGE COLLECTION METHOD FOR NONVOLATILE MEMORY DEVICE

(75) Inventors: Lucius Yun, Hwaseong-si (KR); Shin-Ho Oh, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 154 days.

(21) Appl. No.: 13/559,637

(22) Filed: Jul. 27, 2012

(65) Prior Publication Data

US 2013/0117501 A1  May 9, 2013

(30) Foreign Application Priority Data

Nov. 7, 2011 (KR) .................. 10-2011-0115297

(51) Int. Cl.
*G06F 12/02* (2006.01)

(52) U.S. Cl.
CPC ........ *G06F 12/0261* (2013.01); *G06F 12/0253* (2013.01)
USPC ...... 711/103; 711/156; 711/170; 365/165.33; 707/813; 707/814

(58) Field of Classification Search
CPC .................. G06F 12/0261; G06F 12/0253
USPC .................. 711/103, 156, 170; 365/185.33; 707/813, 814
See application file for complete search history.

(56) References Cited

U.S. PATENT DOCUMENTS

| | | | |
|---|---|---|---|
| 7,610,442 B2 * | 10/2009 | Kim et al. ................ | 711/112 |
| 7,631,162 B2 | 12/2009 | Gorobets | |
| 8,364,924 B2 * | 1/2013 | Belluomini et al. ......... | 711/165 |
| 8,417,878 B2 * | 4/2013 | Goss et al. ................ | 711/103 |
| 8,429,352 B2 * | 4/2013 | Sinclair ..................... | 711/135 |
| 8,433,981 B1 * | 4/2013 | Agarwal et al. ............ | 714/773 |
| 8,612,718 B2 * | 12/2013 | Li et al. .................... | 711/201 |
| 2010/0057976 A1 * | 3/2010 | Lasser ..................... | 711/103 |
| 2010/0325351 A1 * | 12/2010 | Bennett .................... | 711/103 |
| 2011/0107050 A1 | 5/2011 | Vengerov | |
| 2012/0023144 A1 * | 1/2012 | Rub ........................ | 707/813 |
| 2012/0191936 A1 * | 7/2012 | Ebsen et al. .............. | 711/170 |
| 2013/0166818 A1 * | 6/2013 | Sela ......................... | 711/103 |

FOREIGN PATENT DOCUMENTS

KR  100988388  11/2010

* cited by examiner

*Primary Examiner* — Stephen Elmore
(74) *Attorney, Agent, or Firm* — Volentine & Whitt, PLLC

(57) ABSTRACT

A nonvolatile memory device includes a memory area having free segments and first to fourth regions having used segments. The garbage collection method includes selecting a target segment from the used segments, moving a valid data block from the selected target segment to the used segments, and erasing data of all data blocks in the selected target segment and making the selected target segment into a free segment. When the number of free segments is greater than a predefined value, the target segment is selected by a first method and valid data blocks in the target segment are moved by a second method. When the number of free segments is less than the predefined value, the target segment is selected by a third method and valid data blocks in the target segment are moved by a fourth method.

20 Claims, 15 Drawing Sheets

GARBAGE COLLECTION METHOD FOR NONVOLATILE MEMORY DEVICE

CROSS-REFERENCE TO RELATED APPLICATION

A claim of priority under 35 U.S.C. §119 is made to Korean Patent Application No. 10-2011-0115297 filed on Nov. 7, 2011, in the Korean Intellectual Property Office, the entire contents of which are hereby incorporated by reference.

BACKGROUND

The present inventive concept relates to a garbage collection method for a nonvolatile memory device.

In general, embedded systems, such as electronic home appliances, communication devices, and set top boxes, employ nonvolatile memory as a storage medium. Nonvolatile memory has the advantages of both random access memory (RAM), which freely writes and erases data, and read only memory (ROM), which preserves stored data even without power.

Also, commonly used flash memory is a nonvolatile memory device that is able to electrically write and erase data. Flash memory is suitable for portable devices because of its advantages of small size, lower power consumption than magnetic disc memories, and fast access time like hard drives.

When data is newly written to a nonvolatile memory device, a valid data block having existing data written therein is maintained as an invalid data block and a data block is allocated thereto to write data to be newly written. Here, when available space of the nonvolatile memory device is insufficient, "garbage collection" is performed to collect valid data blocks into used segment to generate free segments, thereby increasing the available space. In the course of performing garbage collection, operational overhead may be created, resulting in deteriorated performance of the nonvolatile memory device. Accordingly, research into methods for minimizing unnecessary overhead is actively under way.

SUMMARY

The inventive concept provides a garbage collection method of a nonvolatile memory device that can be efficiently performed by minimizing overhead in the course of performing garbage collection. The above and other objects of the inventive concept will be described in or be apparent from the following description of various embodiments.

According to an aspect of the inventive concept, there is provided a garbage collection method for a nonvolatile memory device, including a memory area having multiple free segments and first to fourth regions having multiple used segments. The method includes selecting a target segment from the used segments, moving a valid data block included in the selected target segment to the used segments included in one of the first to fourth regions, and erasing data of all data blocks included in the selected target segment and making the selected target segment into a free segment. When the number of free segments included in the memory area is greater than a predefined value, the target segment is selected by a first method and valid data blocks included in the target segment are moved by a second method. When the number of free segments included in the memory area is less than the predefined value, the target segment is selected by a third method different from the first method and valid data blocks included in the target segment are moved by a fourth method different from the second method.

According to another aspect of the inventive concept, there is provided a garbage collection method of a nonvolatile memory device including a memory area having multiple free segments and first to fourth regions having multiple used segments, respectively. The method includes, when the number of free segments included in the memory area is greater than a predefined value, selecting a target segment from the used segments in consideration of the number of valid data blocks included in each of the used segments and an entry time of the valid data blocks, and when the number of free segments included in the memory area is less than the predefined value, selecting a used segment having the smallest number of valid data blocks among the used segments as the target segment, without consideration of the entry time of the valid data blocks, moving a valid data block included in the selected target segment to a used segment included in the first region, and erasing data of all data blocks included in the selected target segment and making the selected target segment into a free segment.

According to another aspect of the inventive concept, there is provided a memory system, including a memory device and a controller. The nonvolatile memory device includes a memory area, the memory area having multiple free segments and multiple regions having multiple used segments each. The controller is configured to determine whether the number of free segments included in the memory area is greater than a predefined value, to select a target segment from the multiple used segments in one of the regions based on the determination, to move a valid data block included in the selected target segment to a used segment included in another one of the regions, and to erase data of all data blocks included in the selected target segment. When the number of free segments included in the memory area is greater than the predefined value, the target segment is selected in consideration of the number of valid data blocks included in each of the used segments in the one of the regions and an entry time of the valid data blocks, and when the number of free segments included in the memory area is less than the predefined value, the target segment is selected in consideration of the number of valid data blocks included in each of the used segments in the one of the regions, without consideration of the entry time of the valid data blocks.

BRIEF DESCRIPTION OF THE DRAWINGS

Exemplary embodiments will be more clearly understood from the following detailed description taken in conjunction with the accompanying drawings, in which.

DETAILED DESCRIPTION OF THE EMBODIMENTS

Figure 1:
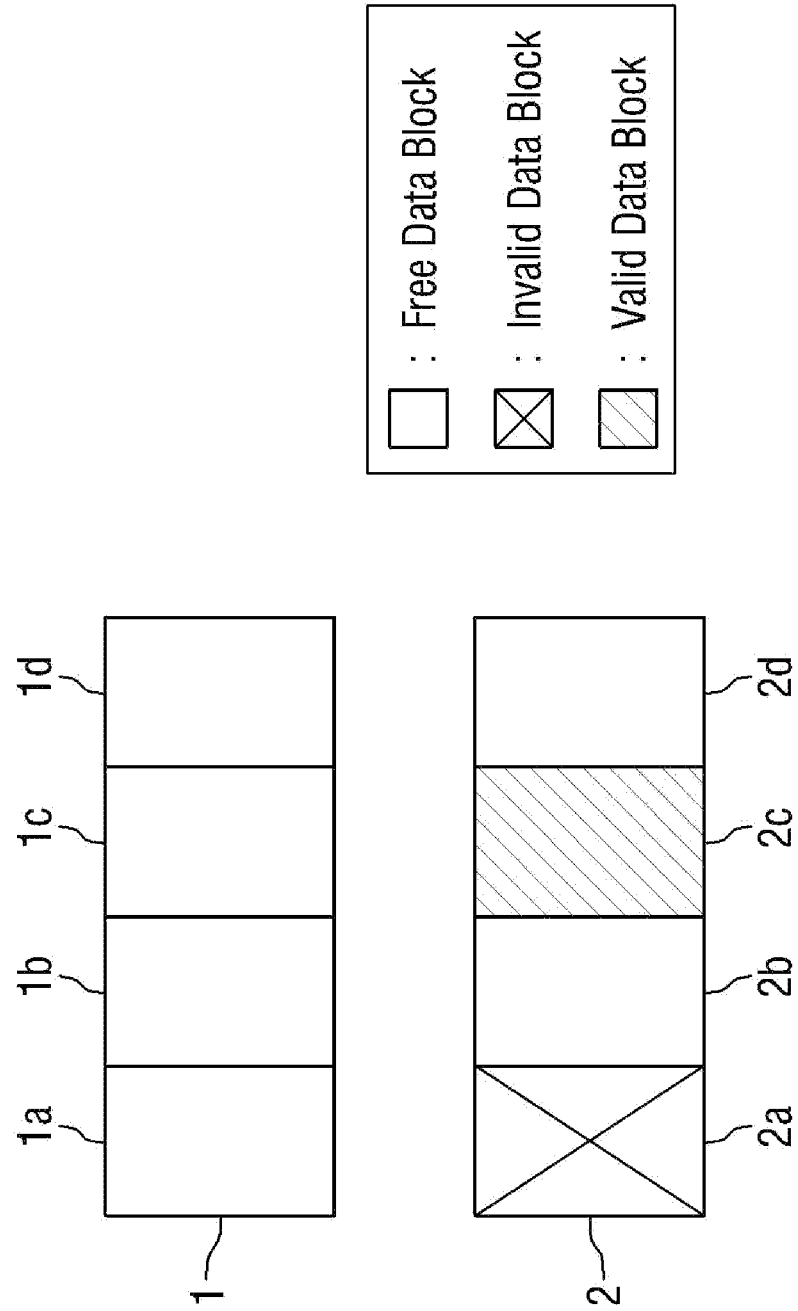
FIG. 1 is a diagram for explaining terms used throughout the specification to describe embodiments of the inventive concept.

Embodiments will be described in detail with reference to the accompanying drawings. The inventive concept, however, may be embodied in various different forms, and should not be construed as being limited only to the illustrated embodiments. Rather, these embodiments are provided as examples so that this disclosure will be thorough and complete, and will fully convey the concept of the inventive concept to those skilled in the art. Accordingly, known processes, elements, and techniques are not described with respect to some of the embodiments of the inventive concept. In the drawings, the thicknesses of layers and regions are exaggerated for clarity. Unless otherwise noted, like reference numerals denote like elements throughout the attached drawings and written description, and thus descriptions will not be repeated.

The use of the terms "a" and "an" and "the" and similar referents in the context of describing the inventive concept (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

Unless defined otherwise, all technical and scientific terms used herein have the same meaning as commonly understood by one of ordinary skill in the relevant art. It is noted that the use of any and all examples, or exemplary terms provided herein is intended merely to better illuminate the inventive concept and is not a limitation on the scope of the inventive concept unless otherwise specified. Further, unless defined otherwise, all terms defined in generally used dictionaries may not be overly interpreted.

FIG. 1 is a diagram for explaining terms used throughout the specification of the inventive concept with respect to a nonvolatile memory device.

Referring to FIG. 1, data blocks 1a~1d and 2a~2d refer to spaces in which data stored in the nonvolatile memory device are written. One of the data blocks 1a~1d and 2a~2d may correspond to a page of the nonvolatile memory device, for example, although embodiments of the inventive concept are not limited thereto. That is, the data blocks 1a~1d and 2a~2d may take any form irrespective of corresponding storage space, as long as the data stored in the nonvolatile memory device can be entered thereto. When necessary, one of the data blocks 1a~1d and 2a~2d may correspond to a sector of the nonvolatile memory device, for example.

The data blocks 1a~1d and 2a~2d have data written therein, and may be divided into valid data block 2c, in which valid data is written, invalid data block 2a in which invalid data is written, and free data blocks 1a~1d, 2b and 2d in which no data is written.

Segments 1 and 2 indicate unit storage spaces formed by collecting one or more data blocks 1a~1d and 2a~2d, respectively. In the depicted example, segment 1 is a free segment including only free data blocks 1a~1d, and segment 2 is a used segment including at least one of the valid data block 2c and the invalid data block 2c. The segments 1 and 2 may be further divided according to the kind of data block included therein. However, for brevity of description, the segments 1 and 2 are divided into only two types.

In FIG. 1, it is illustrated that four data blocks 1a~1d are included in segment 1, and four data blocks 2a~2d are included in segment 2. Hereinafter, embodiments of the inventive concept will be described by way of example with regard to the segments 1 and 2 including four data blocks 1a~1d and 2a~2d, respectively, which is illustrated only for convenience of explanation, although the embodiments of the inventive concept are not limited thereto. That is, the number of data blocks 1a~1d and 2a~2d included in each of the segments 1 and 2 may be increased or decreased without departing from the scope of the present teachings.

Hereinafter, a garbage collection method of a nonvolatile memory device according to embodiments of the inventive concept will be described with reference to FIGS. 2 to 11.

Figure 2:
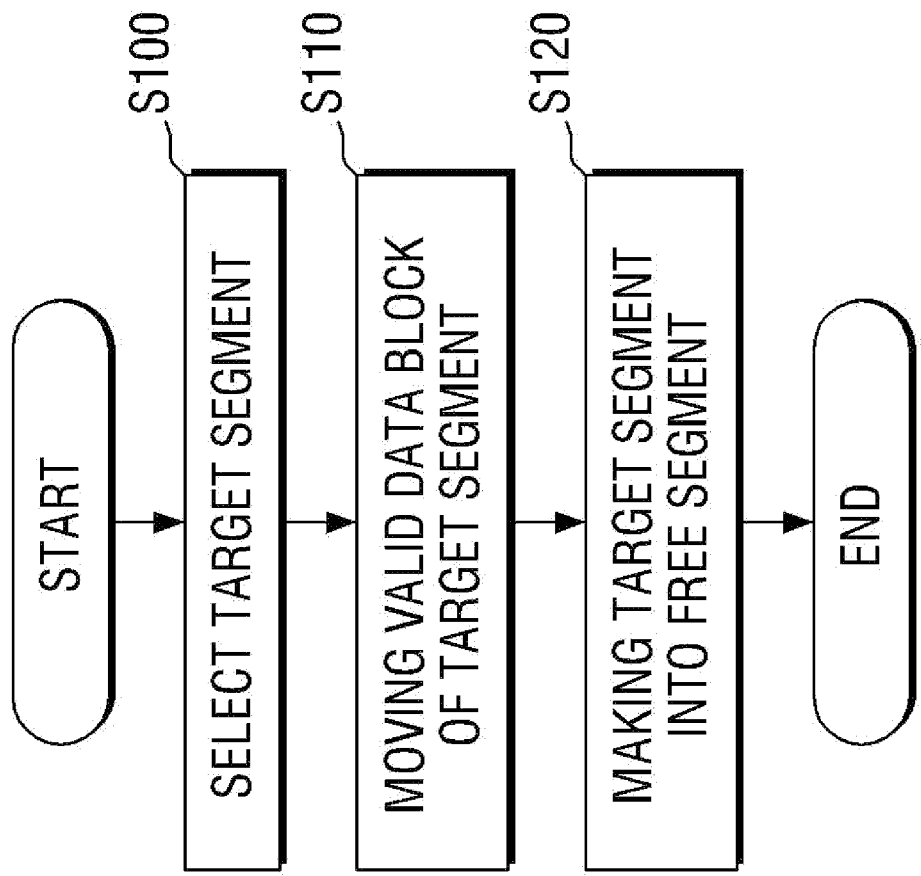
FIG. 2 is a flowchart of a garbage collection method of a nonvolatile memory device, according to an embodiment of the inventive concept.

FIG. 2 is a flowchart of a garbage collection method of a nonvolatile memory device, according to an embodiment of the inventive concept. FIGS. 3 to 11 illustrate data blocks of a nonvolatile memory device for performing the garbage collection method shown in FIG. 2, according to embodiments of the inventive concept.

Referring to FIG. 2, a target segment to be subjected to garbage collection is selected from used segments in a memory area of the nonvolatile memory device (S100), as described with reference to FIG. 3. A valid data block of the selected target segment is moved to another used segment of the memory area (S110), as described with reference to FIGS. 3 to 5. The target segment is then made into a free segment by erasing data in all data blocks included in the target segment (S120), as described with reference to FIG. 6.

Figure 3:
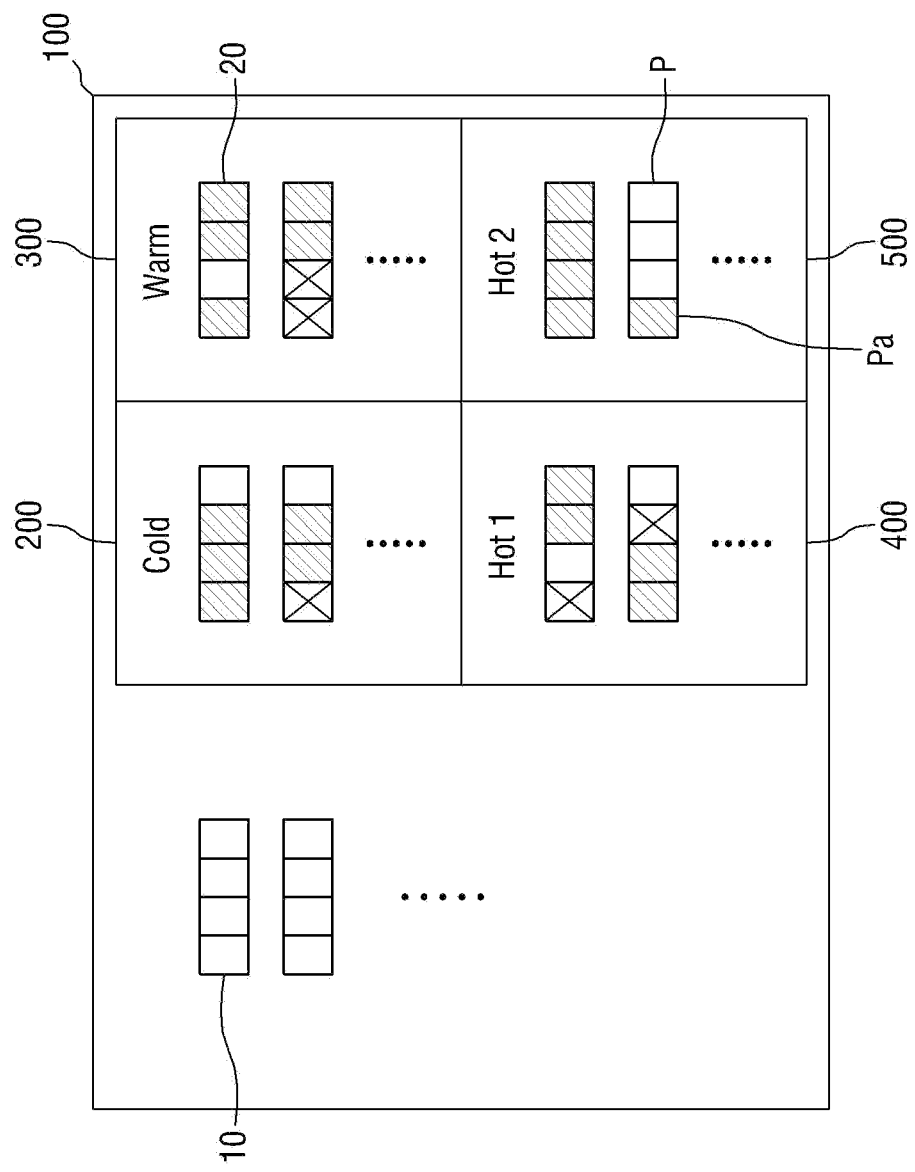
FIGS. 3 to 11 are diagrams illustrating a garbage collection method of a nonvolatile memory device, according to an embodiment of the inventive concept.

Referring to FIG. 3, memory area 100 of a nonvolatile memory device is illustrated. The memory area 100 includes multiple free segments 10. The memory area 100 also includes representative first to fourth regions 200 to 500, each of which includes used segments 20. In the depicted example, selecting target segments to be subjected to garbage collection from the used segments 20 varies according to the number of free segments 10 included in the memory area 100.

When the number of free segments 10 included in the memory area 100 is greater than a predefined value, which may be designated by a user, for example, a target segment is selected in consideration of the number of valid data blocks included in each of the used segments 20 and an entry time of the valid data blocks. Conversely, when the number of free segments 10 included in the memory area 100 is less than the predefined value, a target segment is selected in consideration of only the number of valid data blocks included in each of the used segments 20. That is, the target segment selected may vary according to the amount of available space in the memory area 100 (for example, the number of free segments 10), as a result of different methods of target segment selection.

The target segment selection method for garbage collection varies according to the amount of an available space in the memory area 100 for a number of reasons. First, when there is a large amount of available space in the memory area 100 (e.g., the number of free segments 10 exceeds the predefined value, indicating that there are plenty of free segments 10 available), the number of free segments 10 that can be allocated to data newly recorded in the nonvolatile memory device or newly written (input to the memory area 100) is sufficient. Therefore, even if overhead created in the course of, selecting a target segment to be subjected to garbage collection is substantial, the overhead will not considerably affect device performance. In this case, the target segment to be subjected to garbage collection is selected by comprehensively considering the number of valid data blocks included in each of the used segments 20 and the entry time of the valid data blocks. Even if overhead is created during this process, the overhead may not adversely affect performance of the nonvolatile memory device.

However, when the amount of available space in the memory area 100 is small (e.g., the number of free segments 10 is below the predefined value, indicating that there are a small number of free segments 10 in the memory area 100), the number of free segments 10 that may be allocated to data newly entered to the nonvolatile memory device or newly written (that is, input to the memory area 100) is insufficient. In this case, it is necessary to generate free segments 10 by performing garbage collection as rapidly as possible. Therefore, any overhead created in the process of selecting a target segment for garbage collection may adversely affect the performance of the nonvolatile memory device, and thus should be avoided. Therefore, the target segment is selected in consideration of only the number of valid data blocks included in each of the used segments 20, without consideration of an entry time of the valid data blocks. When the target segment is selected in consideration of only the number of valid data blocks included in each of the used segments 20, the overhead created in the process of selecting a target segment is greatly reduced, compared to a case in which the target segment is selected in consideration of an entry time of the valid data blocks as well as the number of valid data blocks included in each of the used segments 20. Accordingly, the overhead created in the course of garbage collection is minimized.

Hereinafter, for consistent description of the embodiments, a garbage collection method for a case in which the number of free segments 10 included in the memory area 100 is greater than a predefined value is first described, and a garbage collection method for a case in which the number of free segments 10 included in the memory area 100 is less than the predefined value is subsequently described.

Referring again to FIG. 3, when the number of free segments 10 included in the memory area 100 is greater than a predefined value, the target segment is selected in consideration of the number of valid data blocks included in each of the used segments 20 and the entry time of the valid data blocks. For example, a cost-benefit method may be used as a method for selecting the target segment.

According to the cost-benefit method, values for respective used segments 20 are calculated according to Equation (1), in which u denotes the number of valid data blocks included in each used segment 20, and Age denotes an entry time of the valid data blocks included in the used segment 20:

$$\frac{((1-u) \times \text{Age})}{(1+u)} \quad \text{Equation (1)}$$

The calculated values of the used segments are compared to one another, and the used segment 20 having the maximum value from among the calculated values is selected as the target segment. In this manner, the used segment 20 having the fewest number of valid data blocks and/or the oldest in terms of time of entry may be identified. For purposes of illustration, it may be assumed that the selected used segment 20 is designated target segment P, which is included in the fourth region 500 of the memory area 100 shown in FIG. 3.

Referring again to FIG. 2, a valid data block of the selected target segment P is moved to another used segment included in at least one of the first to fourth regions 200 to 500 (S110), described with reference to FIGS. 3 to 5.

In other words, when the target segment P is selected in the above-described manner, data of all data blocks included in the selected target segment P are to be erased to make the target segment P a free segment 10. Therefore, each valid data block, such as representative valid data block Pa, included in the selected target segment P should be moved to another used segment 20 included in at least one of the first to fourth regions 200 to 500 before the data blocks are erased.

Figure 4:
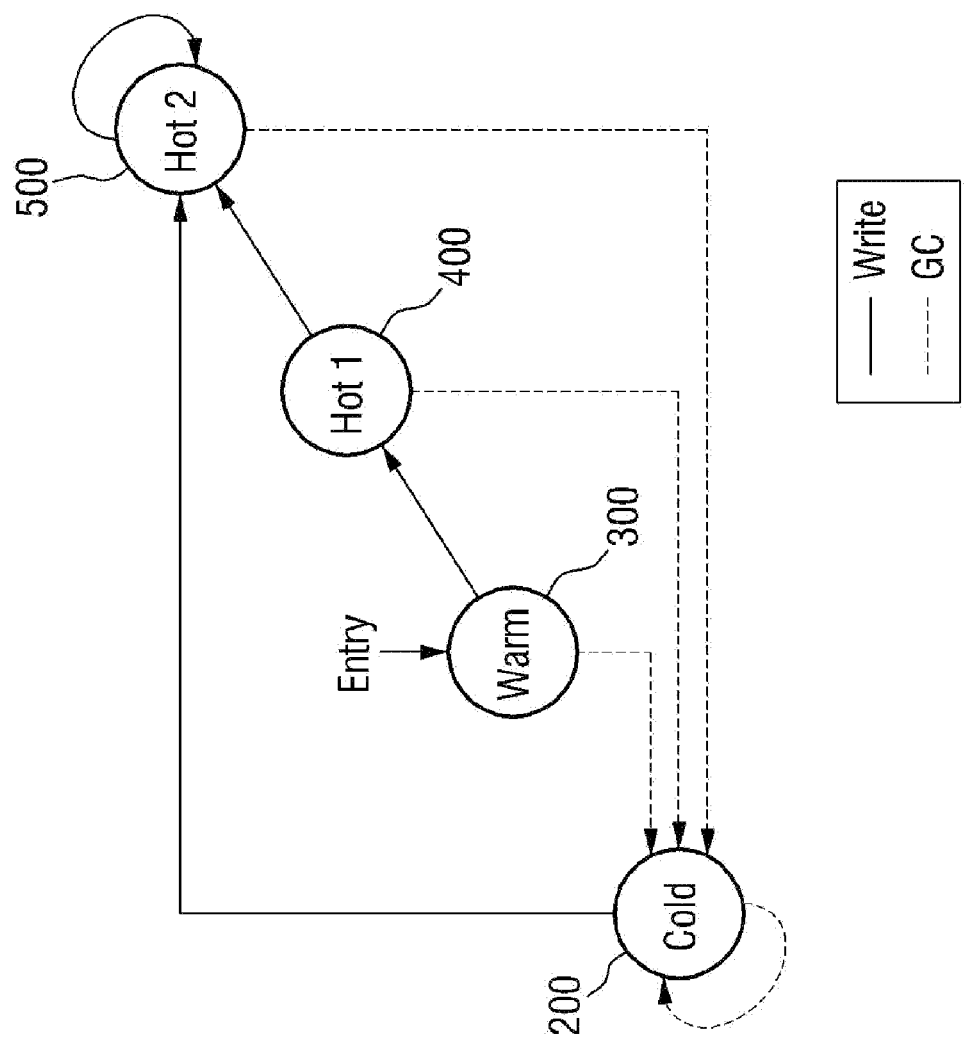
Figure 5:
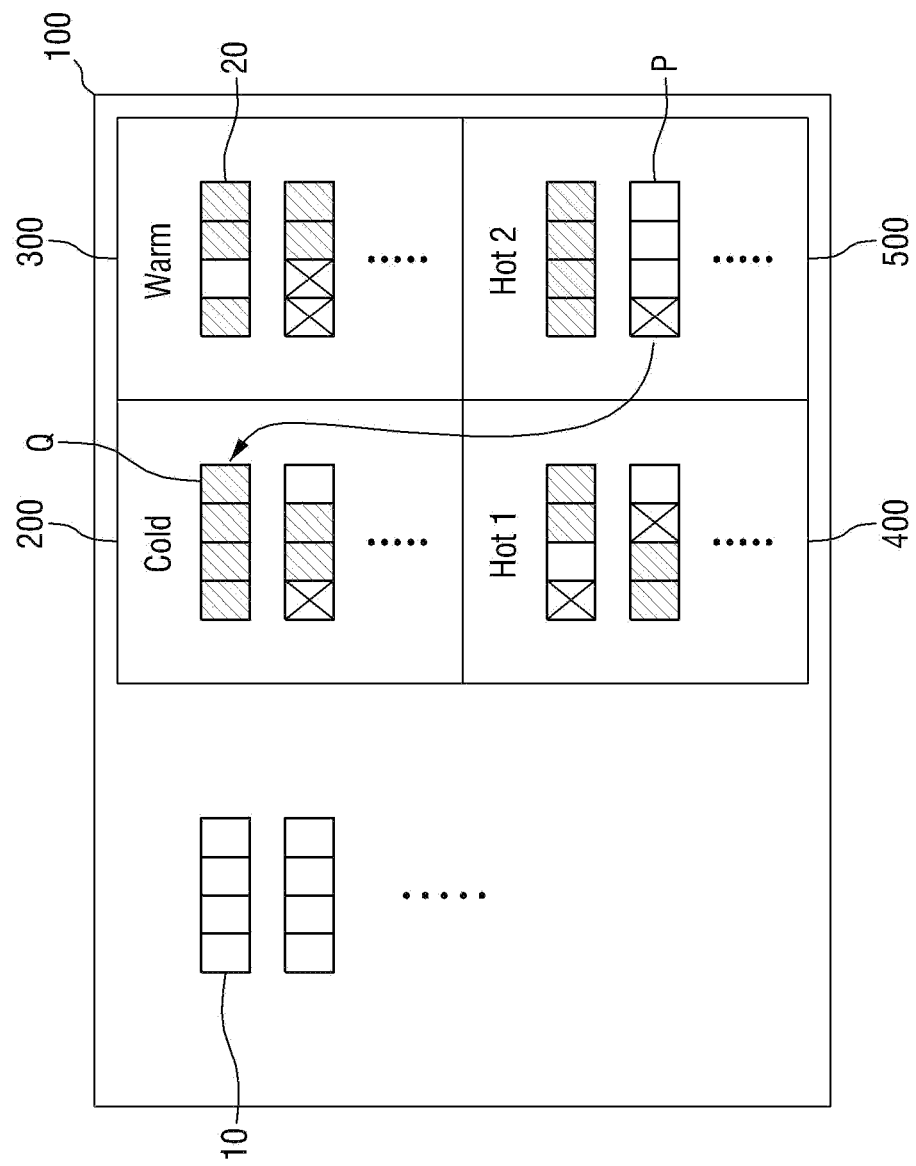

In an embodiment, it is determined to which region of the first to fourth regions 200 to 500 the valid data block Pa of the selected target segment P is to be moved, according to the scheme shown in the diagram of FIG. 4. Generally, when a used segment included in a particular region is selected as a target segment for garbage collection (GC), FIG. 4 illustrates the region to which a valid data block included in the selected used segment is to be moved. Movement of the valid data block based on garbage collection (GC) is indicated by dotted lines.

In the exampled depicted in FIG. 4, all valid data blocks included in the target segment may be moved to used segment(s) of the first region 200, irrespective of the region in which the target segment is included. The reason for moving the valid data blocks included in the target segment to used segment(s) of the first region 200 will be discussed below with respect to data redistribution, according to an embodiment.

Meanwhile, referring to FIGS. 3 and 4, since the target segment P is included in the fourth region 500, the valid data block Pa of the target segment P is moved to a used segment of the first region 200. Therefore, as shown in FIG. 5, the valid data block Pa of the target segment P included in the fourth region 500 is written in representative used segment Q included in the first region 200, and the valid data block Pa of the target segment P is changed to an invalid data block.

Referring again to FIG. 2, the target segment is made into a free segment by erasing data in all data blocks included in the target segment (S120).

Figure 6:
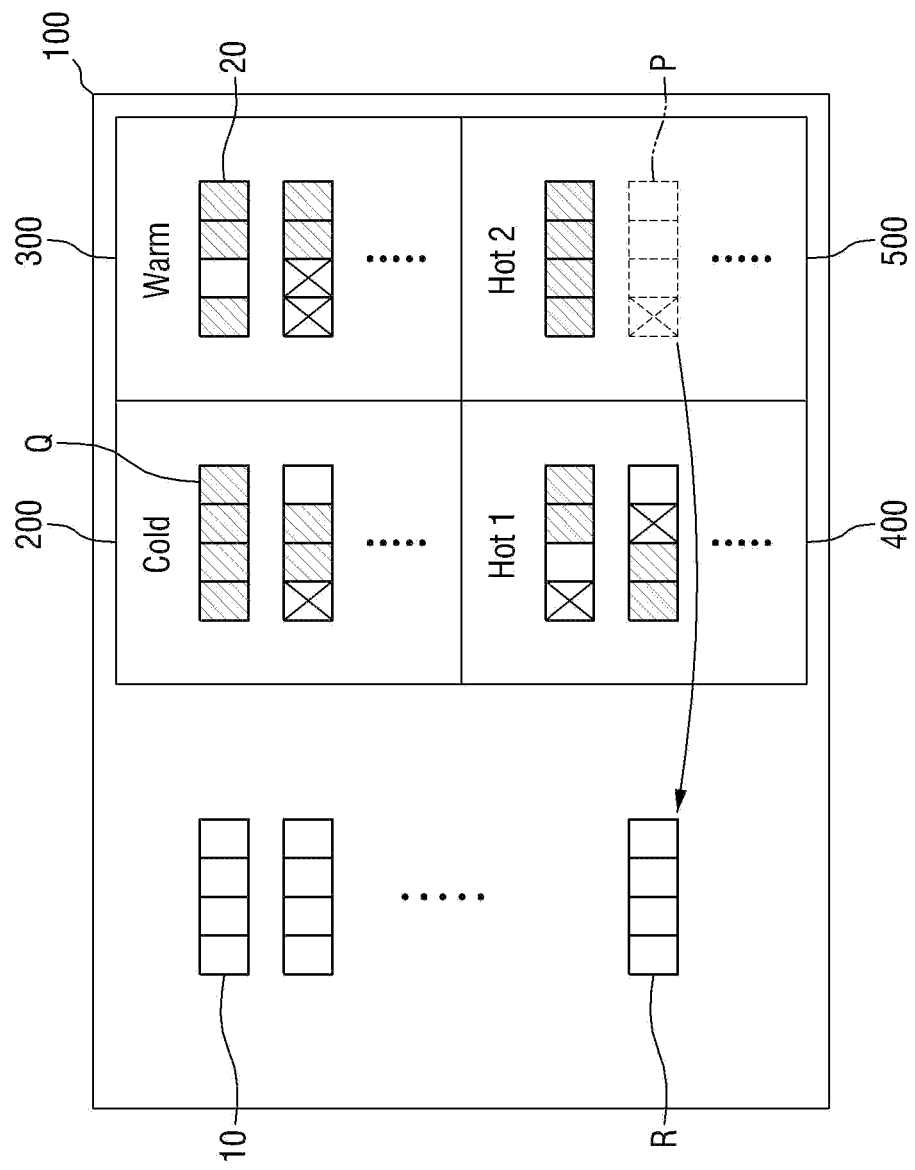

Referring to FIG. 6, since the valid data block Pa has been moved to the used segment Q included in the first region 200, the target segment P includes only one invalid data block, and no valid data blocks. The invalid data block is erased so that the target segment P includes only free data blocks. The target segment P including only free data blocks is made into a free segment R.

The diagram of FIG. 4 also shows a data redistribution method performed before garbage collection. In the depicted embodiment, data is redistributed in the nonvolatile memory device along solid lines shown in FIG. 4 and garbage collection is performed along dotted lines. FIG. 3 shows a state of the memory area 100 at the time of selecting the target segment P, after data redistribution of new data D has been performed according to the scheme shown in the diagram of FIG. 4. In other words, FIG. 3 shows the end result of sequential redistribution processes described below with reference to FIGS. 4 and 7 to 9.

The data redistribution according to the embodiment of the inventive concept will be described with reference to FIGS. 4 and 7 to 9.

Figure 7:
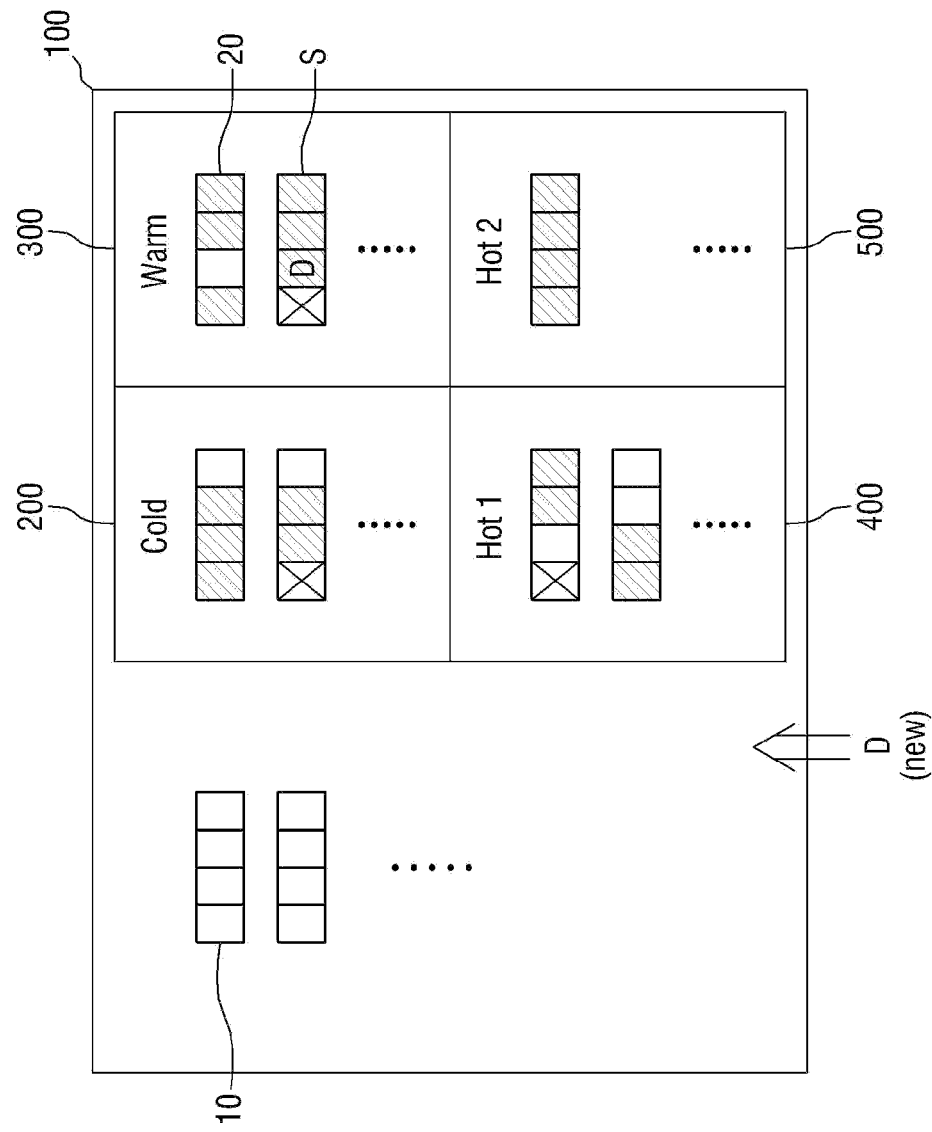
Figure 8:
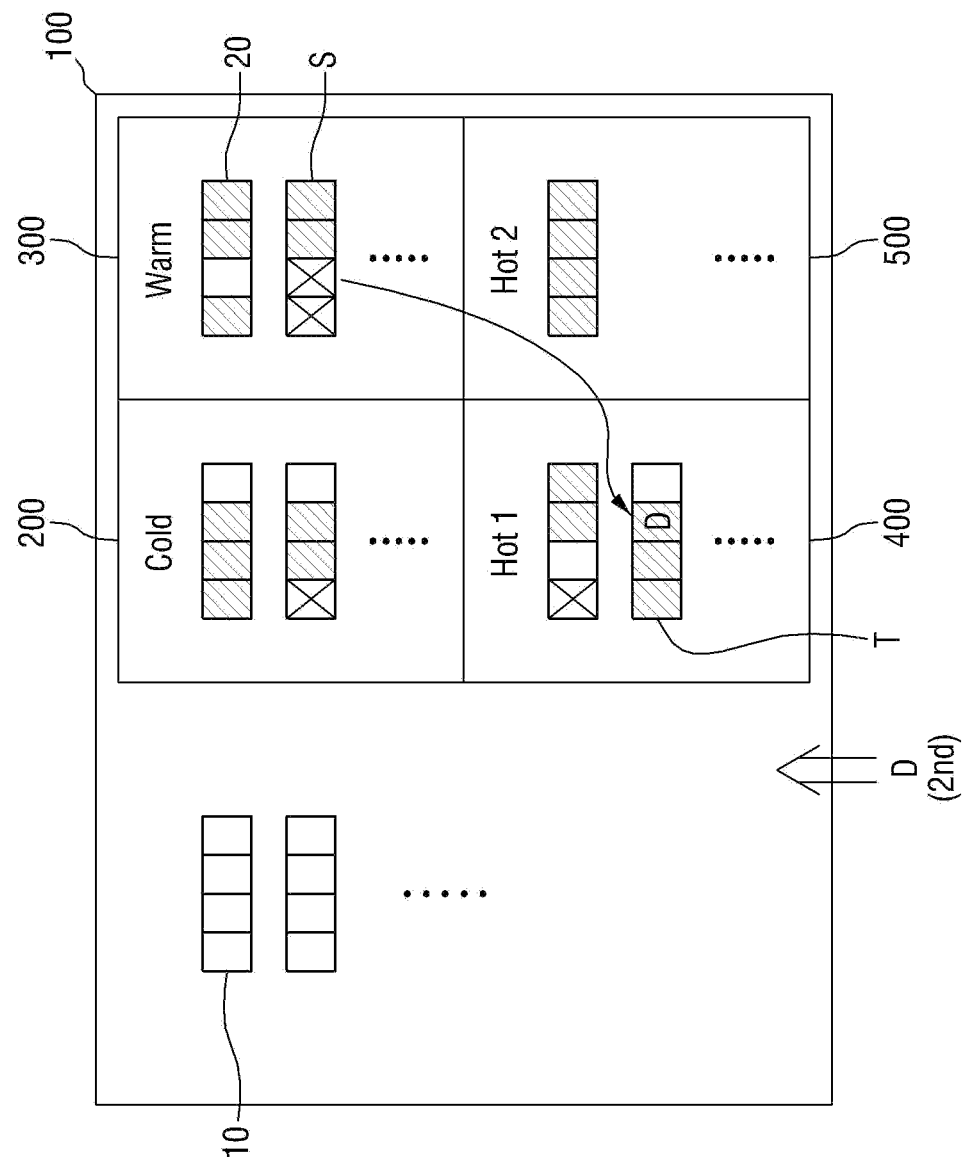

First, it is assumed that new data D is newly entered to the memory area 100, as shown in FIG. 7, meaning that data D is newly written to the memory area 100 of the nonvolatile memory device, for example. Referring to FIG. 4, the new data D provided to the nonvolatile memory device is illustrated by "Entry" into the second region 300. There may be two possible entry methods of the new data D into the second region 300. First, the new data D may be entered in free data block(s) of one of the used segments 20 included in the second region 300. If no free data blocks exist in the used segments 20 included in the second region 300, the new data D may be entered into a free segment 10, and the free segment 10 may be included in the second region 300. FIG. 7 illustrates the new data D entered into a free data block of a used segment S in the second region 300, for example.

In such a state, if the data D is re-entered into the memory area 100, the written data D should be redistributed. Referring again to FIG. 4, when the data D is re-entered into the memory area 100, the data D written in the second region 300 is redistributed to the third region 400. Therefore, referring to FIG. 8, the data D in a valid data block of the used segment S included in the second region 300 is entered into a free data block of a used segment T included in the third region 400. The previously valid data block of the used segment S included in the second region 300 is changed to an invalid data block.

Figure 9:
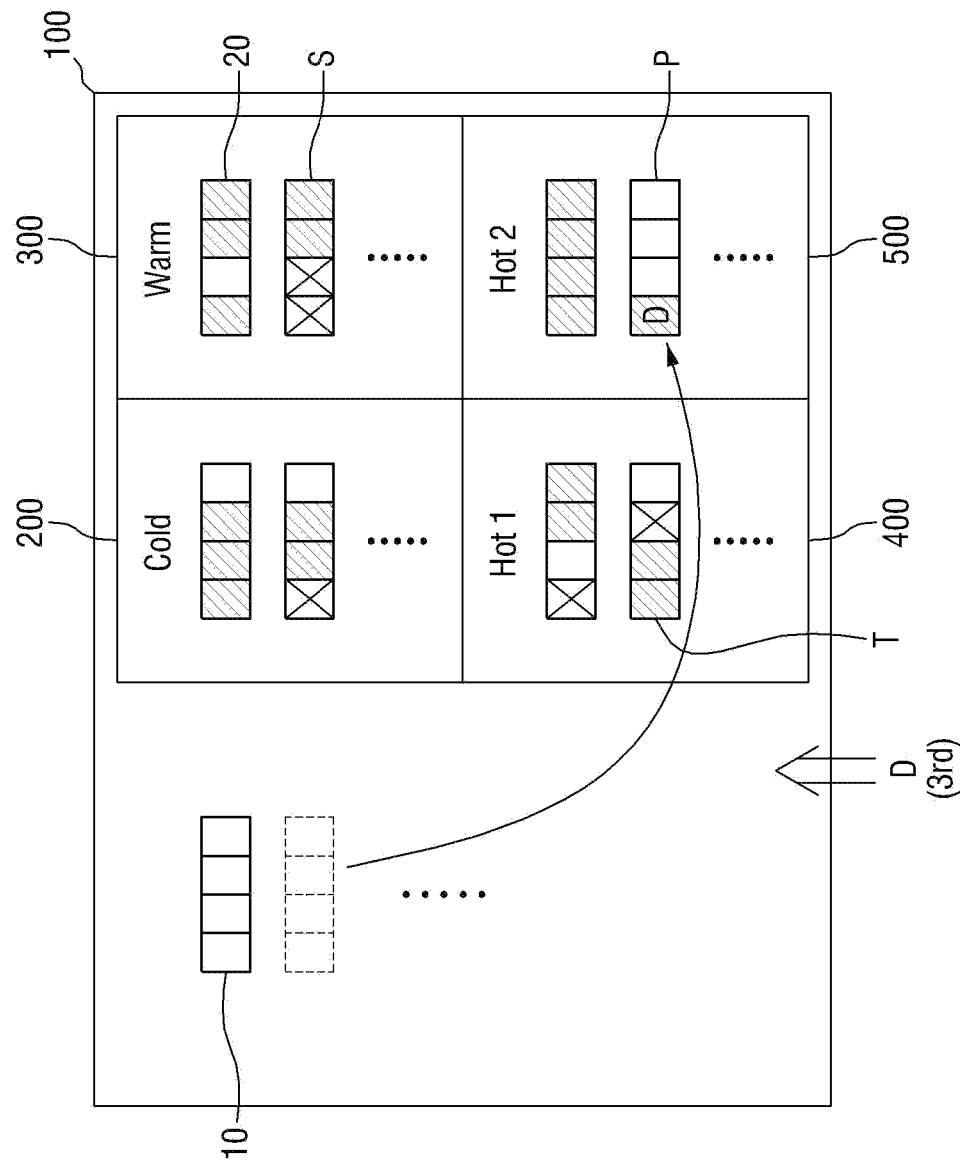

In this state, if the data D is re-entered into the memory area 100, the written data D should be again redistributed. Referring to FIG. 4, when the data D is re-entered into the memory area 100, the data D written in the third region 400 is redistributed to the fourth region 500. Therefore, referring to FIG. 9, the data D in a valid data block of the used segment T included in the third region 400 should be entered into a free data block of a used segment 20 included in the fourth region 500. However, as shown in FIG. 9, when there is no used segment 20 including a free data block in the fourth region 500, the data D is entered into a free segment 10, which is then made into used segment P of the fourth region 500. The previously valid data block of the used segment T included in the third region 400 is changed to an invalid data block. As mentioned above, the end result of the sequential redistribution processes of the new data D is illustrated as the memory area 100 in FIG. 3.

In summary, in the diagram of FIG. 4, data which has been moved by garbage collection is written in the first region 200, and new data are sequentially written in the respective regions from the second region 300 to the third region 400 to the fourth region 500, such that less frequently written data is written to the second region 300 indicated as "warm" and consecutively more frequently written data is written to the third region 400 indicated as "hot 1" and the fourth region 500 indicated as "hot 2."

When the number of free segments 10 included in the memory area 100 is greater than a predefined value, data redistribution is performed according to the diagram shown in FIG. 4 and garbage collection (GC) is then performed. Referring again to FIG. 4, if the data written in the first region 200 by garbage collection (GC) performed as indicated by dotted lines is re-entered into the memory area 100, the data is redistributed to the fourth region 500. That is, in this embodiment, the data written once is determined as being rewritable soon even if the data have been garbage-collected, and is then entered to the fourth region 500. Meanwhile, the data that has not been garbage-collected is sequentially moved from the second region 300 to the third region 400 to the fourth region 500.

In addition, in this embodiment, irrespective of which one of the first to fourth regions 200 to 500 the data is entered into, once garbage collection is performed, the data is entered into the first region 200. In this way, the data of a valid data block included in the target segment is moved to the first region 100, irrespective of the region of a target segment for garbage collection, because the entry time of the valid data block has already been taken into consideration when selecting the target segment. That is, since the data of the valid data block included in the selected target segment can be considered as data entered into the memory area 100 relatively long ago and scarcely re-entered into the memory area 100, it is entered to the first region 200.

As described above, in this embodiment, data movement based on write operations and data movement based on garbage collection are asymmetrically performed. In such a manner, data redistribution and garbage collection are efficiently performed, while minimizing overhead affecting performance of the nonvolatile memory device.

Next, a garbage collection method for a case where the number of free segments 10 included in the memory area 100 is less than the predefined value is described with reference to FIGS. 3, 10 and 11.

When the number of free segments 10 included in the memory area 100 is less than the predefined value, the target segment is selected in consideration of only the number of valid data blocks included in each of the used segments 20. In other words, the entry time of valid data blocks is not considered. The purpose is to prevent the nonvolatile memory device from being adversely affected, e.g., by excessive overhead, as described above.

Here, an economical method, for example, may be used as a method for selecting the target segment. According to the economical method, a used segment 20 having the smallest number of valid data blocks among multiple used segments 20 may be selected as a target segment, regardless of the time the valid data blocks were entered. For example, as shown in FIG. 3, the used segment P included in the fourth region 500 has the smallest number of valid data blocks. Thus, the used segment P is selected as a target segment P.

Figure 10:
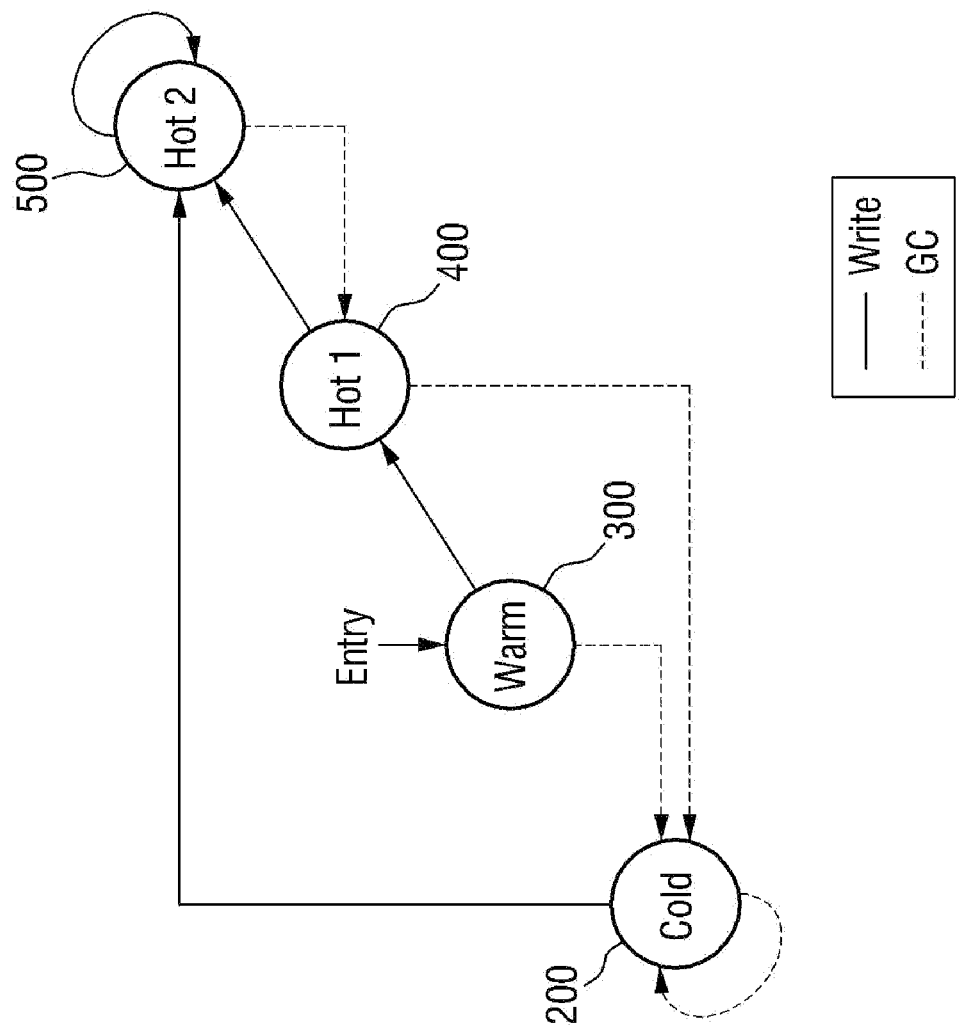
Figure 11:
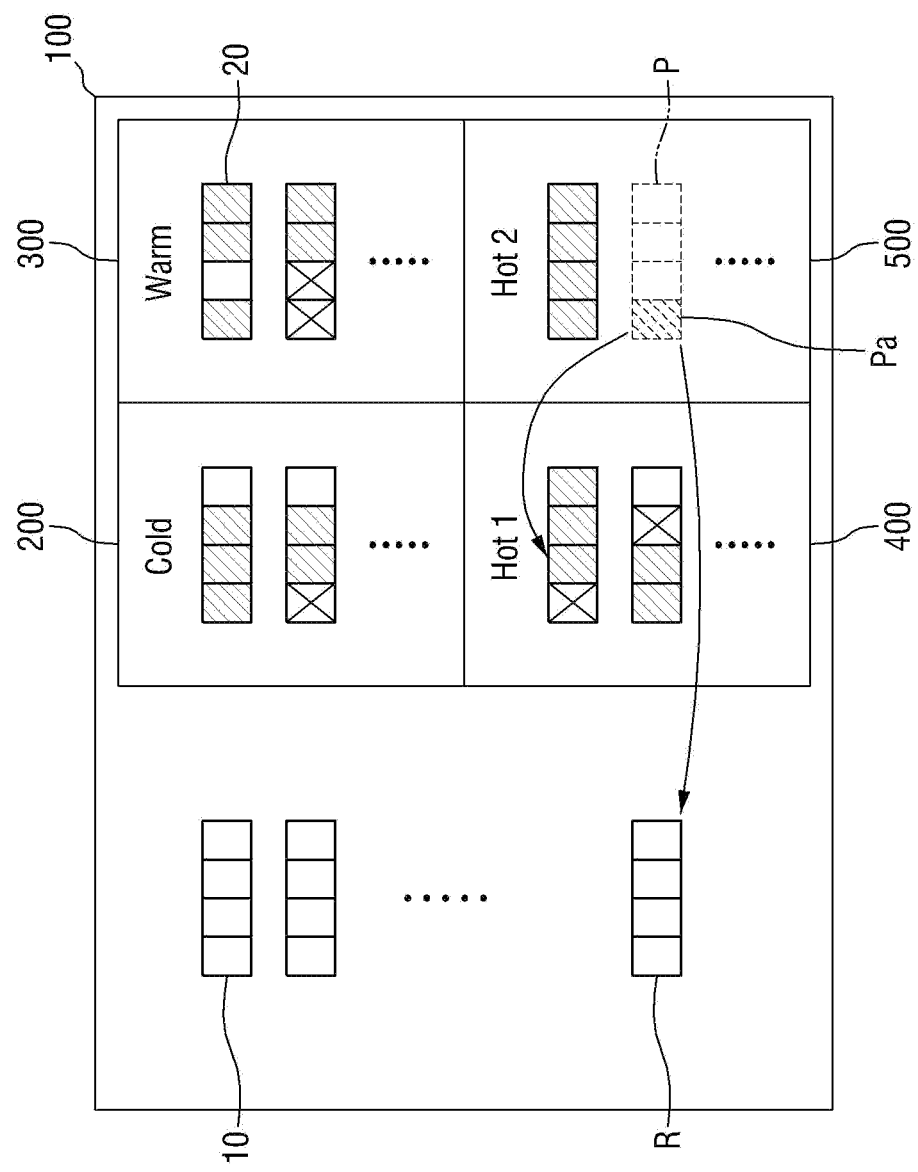

The data of the valid data block Pa included in the target segment P should be moved to a used segment 20 of another region, as shown in FIG. 10. The scheme shown in the diagram of FIG. 10 is similar to that in which the number of free segments 10 included in the memory area 100 is greater than the predefined value (FIG. 4). However, the scheme shown in the diagram of FIG. 10 is different from that shown in the diagram of FIG. 4 in that when a target segment for garbage collection is a used segment 20 of the fourth region 500, the data of a valid data block is moved to a used segment 20 of the third region 400 (as opposed to the first region 200). In this case, as shown in FIG. 11, the data entered into a valid data block of the target segment P included in the fourth region 500 shown in FIG. 3 is entered into the used segment 20 of the third region 400, and the target segment P is made into a free segment R.

The reason the data movement during garbage collection is performed differently, as described above, is that the entry time of a valid data block has not been taken into consideration in selecting the target segment. That is, referring to the diagram of FIG. 10, the fourth region 500 is a region where data is frequently written. If a used segment 20 of the fourth region 500 is selected as the target segment P for garbage collection because it includes the smallest number of valid data blocks, the data entered in a valid data block of the target segment P has a high probability of being rewritten soon. Therefore, the data entered to the valid data block of the target segment P is not moved to a used segment 20 of the first region 200, but is moved to a used segment 20 of the third region 400, thereby allowing the moved data to be written to be moved again to a used segment 20 of the fourth region 500. In other words, as shown in the diagram of FIG. 10, data movement is performed differently according to the method of selecting a target segment, thereby improving the operational efficiency of the nonvolatile memory device.

Since description of the other items is the substantially the same as discussed above where the number of free segments 10 included in the memory area 100 is larger than a predefined value, this description will not be repeated.

Next, a garbage collection method of a nonvolatile memory device according to another embodiment of the inventive concept will be described with reference to FIGS. 2, 4, and 12.

Figure 12:
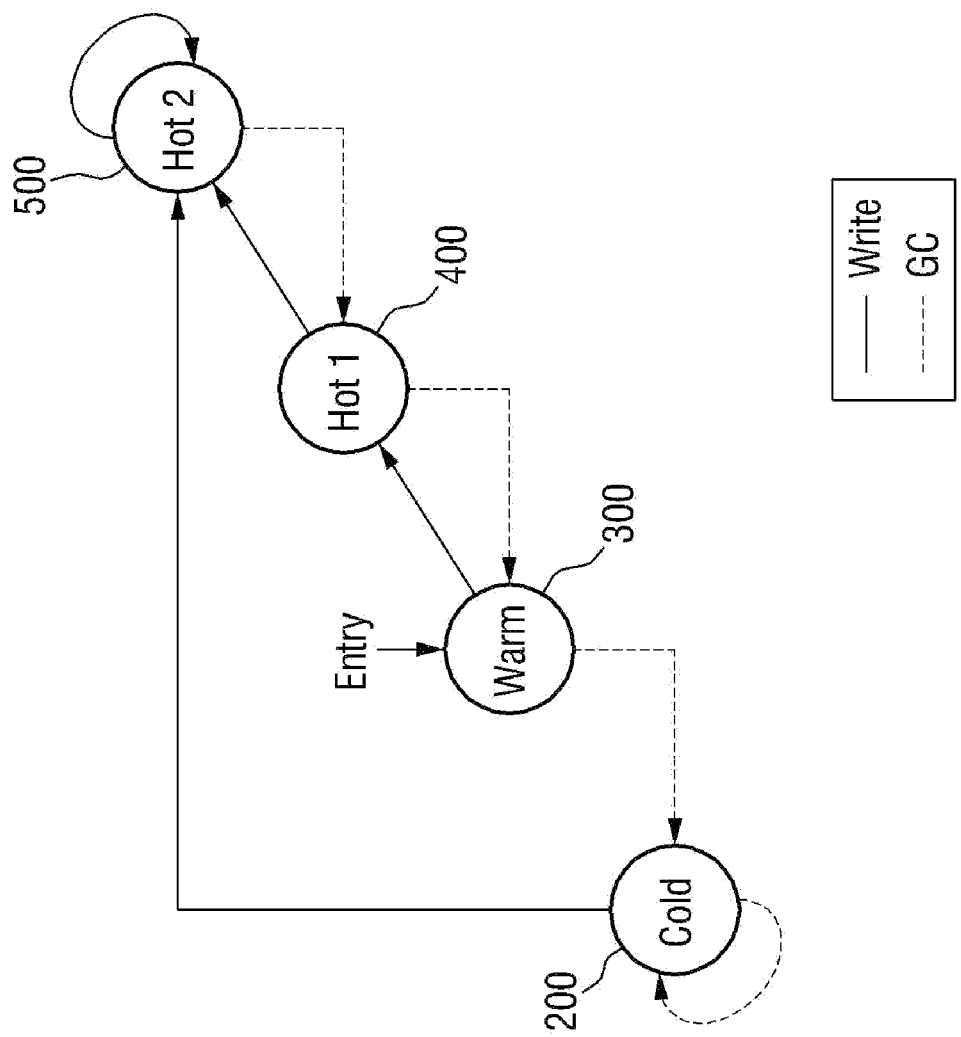
FIG. 12 is a diagram illustrating a garbage collection method of a nonvolatile memory device, according to another embodiment of the inventive concept.

FIG. 12 illustrates a garbage collection method of a nonvolatile memory device, according to another embodiment of the inventive concept.

The garbage collection method of a nonvolatile memory device according to another embodiment of the inventive concept is performed in the same manner as in the previous embodiment to follow the flowchart shown in FIG. 2. That is, as described above in the previous embodiment, a method of selecting a target segment may vary according to an available storage space remaining in a memory area 100 (e.g., the number of free segments 10).

However, in this embodiment, when the number of free segments 10 included in the memory area 100 is larger than a predefined value, garbage collection and data redistribution are performed according to the scheme shown in the diagram of FIG. 4. When the number of free segments 10 included in the memory area 100 is smaller than the predefined value, garbage collection and data redistribution are performed according to the scheme shown in the diagram of FIG. 12.

The scheme shown in the diagram of FIG. 12 is different from that shown in the diagram of FIG. 10 in that, when a target segment for garbage collection is a used segment of a third region 400, the data of a valid data block is not moved to a used segment of a first region 200, but to a used segment of a second region 300. That is, in the depicted embodiment, data movement based on garbage collection is sequentially performed from fourth region 500 to third region 400 to second region 300 and to first region 200, as shown in FIG. 12. The reason the data movement is performed in this manner is that the entry time of a valid data block has not been taken into consideration in selecting a target segment, like in the previous embodiment. Therefore, the performance of the nonvolatile memory device can be improved through efficient data movement.

Since description of the other items is the substantially same as discussed above with respect to the previous embodiment, this description will not be repeated.

Next, a memory system according to embodiments of the inventive concept and exemplary applications thereof will be described with reference to FIGS. 13 to 15.

Figure 13:
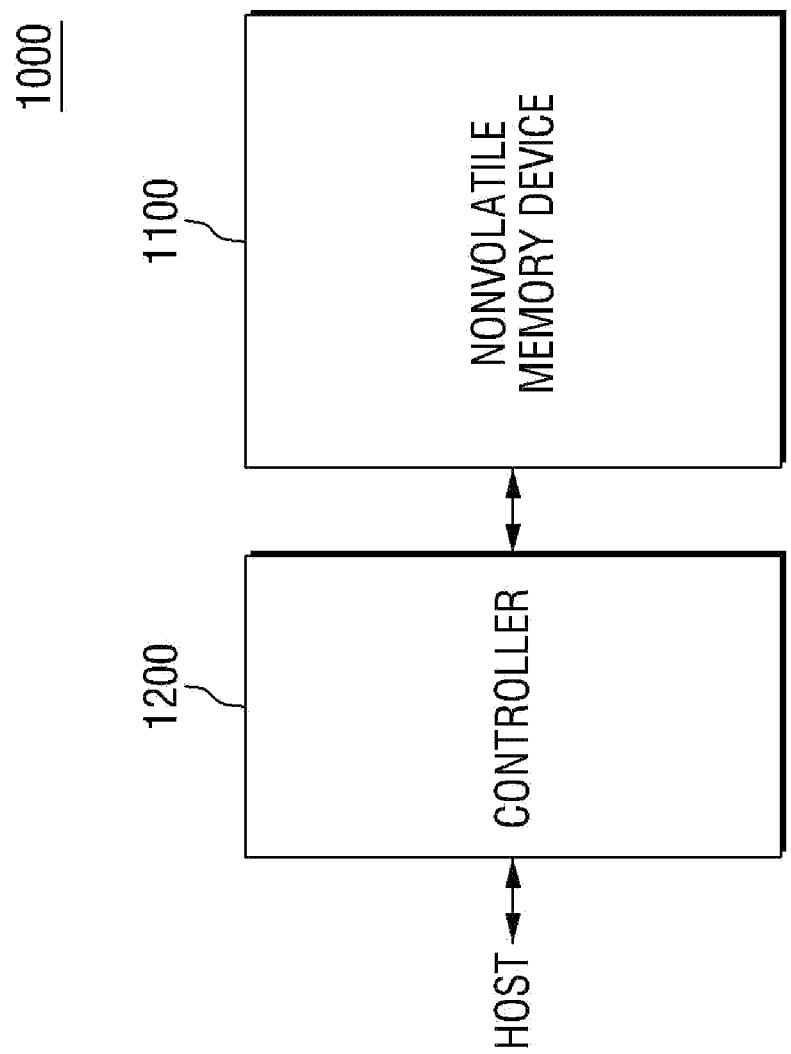
FIG. 13 is a block diagram illustrating a memory system including a nonvolatile memory device, according to embodiments of the inventive concept.
Figure 14:
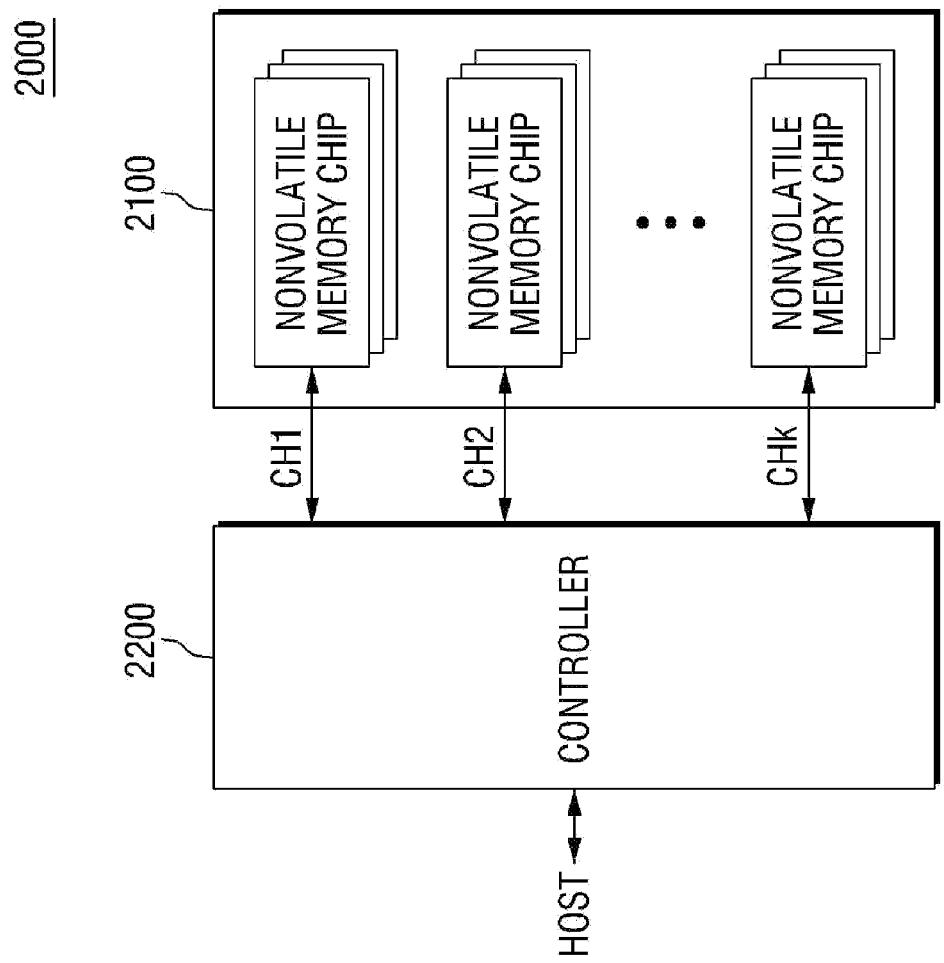
FIG. 14 is a block diagram illustrating an exemplary application of the memory system shown in FIG. 13, according to embodiments of the inventive concept.
Figure 15:
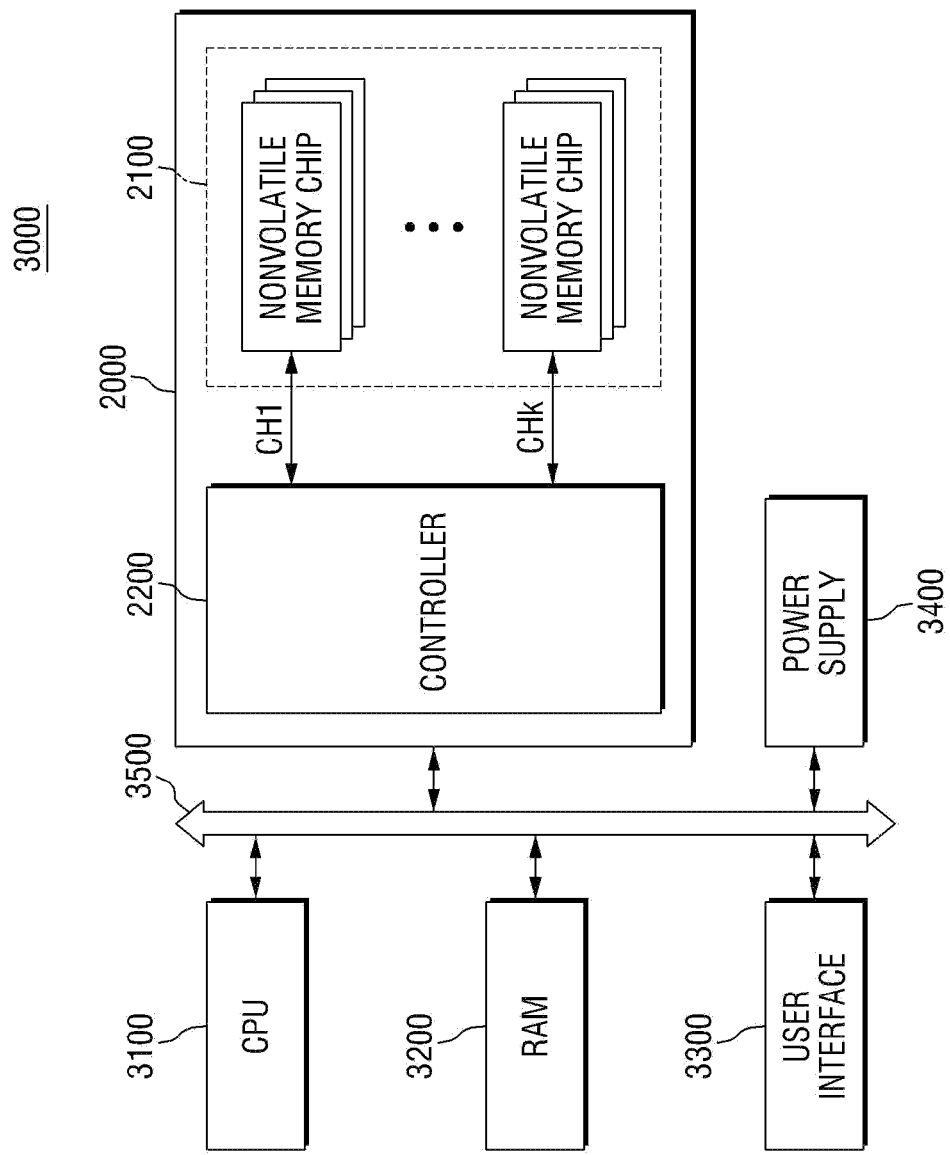
FIG. 15 is a block diagram illustrating a computing system including the memory system shown in FIG. 14, according to embodiments of the inventive concept.

FIG. 13 is a block diagram illustrating a memory system, according to embodiments of the inventive concept, FIG. 14 is a block diagram illustrating an exemplary application the memory system shown in FIG. 13, and FIG. 15 is a block diagram of a computing system including the memory system shown in FIG. 14, according to embodiments of the inventive concept.

Referring to FIG. 13, memory system 1000 includes a nonvolatile memory device 1100 and a controller 1200. The nonvolatile memory device 1100 may have improved operational performance with respect to garbage collection, according to embodiments of the inventive concept, described above. The controller 1200 is connected to a host and the nonvolatile memory device 1100. The controller 1200 is configured to access the nonvolatile memory device 1100 in response to a request from the host. For example, the controller 1200 is configured to control read, erasure and background operations of the nonvolatile memory device 1100. The controller 1200 is configured to drive firmware for controlling the nonvolatile memory device 1100.

For example, the controller 1200 may further include well known constituent elements, such as a random access memory (RAM), a processing unit, a host interface and a memory interface. The RAM is used as at least one of an operation memory of the processing unit, a cache memory between the nonvolatile memory device 1100 and the host, and a buffer memory between the nonvolatile memory device 1100 and the host. The processing unit controls the overall operations of the controller 1200, including implementation of garbage collection according to embodiments of the inventive concept, described above.

The host interface includes a protocol for performing data exchange between the host and the controller 1200. For example, the controller 1200 may be configured to communicate with an external host through at least one of various interface protocols, such as universal serial bus (USB) protocol, multimedia card (MMC) protocol, peripheral component interconnection (PCI) protocol, PCI-express (PCI-E) protocol, advanced technology attachment (ATA) protocol, serial-ATA protocol, parallel-ATA protocol, small computer small interface (SCSI) protocol, enhanced small disk interface (ESDI) protocol, and integrated drive electronics (IDE). The memory interface interfaces with the nonvolatile memory device 1100. For example, the memory interface may include a NAND type interface or a NOR type interface.

The memory system 1000 may be configured to further include an error correction block. The error correction block is configured to detect and correct errors in data read from the nonvolatile memory block 1100 using an error correction code ECC. For example, the error correction block may be provided as a constituent element of the controller 1200 or the nonvolatile memory device 1100.

The controller 1200 and the nonvolatile memory device 1100 may be integrated into one semiconductor device. For example, the controller 1200 and the nonvolatile memory device 1100 may be integrated into one semiconductor device to constitute a memory card, such as a personal computer memory card international association (PCMCIA) card, a compact flash card (CF), a smart media card (SM, SMC), a memory stick, a multimedia card (MMC, RS-MMC, MMC-micro), an SD card (SD, miniSD, microSD, SDHC), a universal flash memory device (UFS), or the like.

The controller 1200 and the nonvolatile memory device 1100 may be integrated into one semiconductor device to constitute a solid state drive (SSD). The solid state drive (SSD) includes a storage device constituted, so as to store data in a semiconductor memory. When the memory system 1000 is used as a solid state drive (SSD), an operation speed of the host connected to the memory system 1000 is greatly improved.

In another example, the memory system 1000 may be provided as one of various constituent elements of an electronic device, such as a computer, an ultra mobile PC (UMPC), a work station, a net-book, a personal digital assistants (PDA), a portable computer, a web tablet, a wireless phone, a mobile phone, a smart phone, an e-book, a portable multimedia player (PMP), a portable game machine, a navigation device, a black box, a digital camera, a 3-dimensional television, a digital audio recorder, a digital audio player, a digital picture recorder, a digital picture player, a digital video recorder, a digital video player, a device which can transmit and receive information in a wireless environment, one of various electronic devices constituting a home network, one of various electronic devices constituting a computer network, one of various electronic devices constituting a telematics network, one of various electronic devices constituting an RFID device or a computing system, or the like.

According to various embodiments, for example, the nonvolatile memory device 1100 or the memory system 1000 may be packaged in various types of packages. For example, the nonvolatile memory device 1100 or the memory system 1000 may be packaged in package types such as Package On Package (POP), Ball Grid Arrays (BGA), Chip Scale Packages (CSP), Plastic Leaded Chip Carrier (PLCC), Plastic Dual In-Line Package (PDIP), Die In Waffle Pack (DIWP), Die In Wafer Form (DIWF), Chip On Board (COB), Ceramic Dual In-Line Package (CERDIP), Plastic Metric Quad Flat Pack (MQFP), Thin Quad Flat Pack (TQFP), Small Outline (SOIC), Shrink Small Outline Package (SSOP), Thin Small Outline Package (TSOP), Thin Quad Flat Pack (TQFP), System In Package (SIP), Multi Chip Package (MCP), Wafer-level Fabricated Package (WFP), Wafer-Level Processed Stack Package (WSP), or the like.

Referring to FIG. 14, memory system 2000 includes a nonvolatile memory device 2100 and a controller 2200. The nonvolatile memory device 2100 includes multiple nonvolatile memory chips. The nonvolatile memory chips are divided into multiple groups. Each group of the nonvolatile memory chips may be configured to communicate with the controller 2200 through a common channel. For example, the nonvolatile memory chips may communicate with the controller 2200 through first to kth channels CH1~CHk.

In FIG. 14, it is illustrated that each group of nonvolatile memory chips are connected to a channel. However, it will be understood that the memory system 2000 may be varied, such that each nonvolatile memory chip is connected to a channel.

Referring to FIG. 15, computing system 3000 includes a central processing unit (CPU) 3100, random access memory (RAM) 3200, a user interface 3300, a power supply 3400 and the memory system 2000. The memory system 2000 is connected to the central processing unit (CPU) 3100, the random access memory (RAM) 3200, the user interface 4300 and the power supply 3400 through a system bus 3500. Data provided through the user interface 3300 or processed by the central processing unit (CPU) 3100 is stored in the memory system 2000.

In FIG. 15, it is illustrated that the nonvolatile memory device 2100 is connected to the system bus 3500 through the controller 2200. However, the nonvolatile memory device 2100 may be directly connected to the system bus 3500.

In FIG. 15, it is illustrated that the memory system 2000 described with FIG. 14 is provided. However, the memory system 2000 can be replaced with the memory system 1000 described with reference to FIG. 13, for example.

As an illustration, the computing system 3000 may be configured to include the memory systems 1000 and 2000 described with reference to FIGS. 13 and 14.

While the inventive concept has been described with reference to exemplary embodiments, it will be apparent to those skilled in the art that various changes and modifications may be made without departing from the spirit and scope of the present invention. Therefore, it should be understood that the above embodiments are not limiting, but illustrative.

What is claimed is:

1. A garbage collection method of a nonvolatile memory device comprising a memory area including a plurality of free segments and first to fourth regions having a plurality of used segments, the method comprising:
    selecting a target segment from the plurality of used segments;
    moving a valid data block included in the selected target segment to the used segments included in one of the first to fourth regions; and
    erasing data of all data blocks included in the selected target segment and making the selected target segment into a free segment,
    wherein when the number of free segments included in the memory area is greater than a predefined value, the target segment is selected by a first method and valid data blocks included in the target segment are moved by a second method, and
    when the number of free segments included in the memory area is less than the predefined value, the target segment is selected by a third method different from the first method and valid data blocks included in the target segment are moved by a fourth method different from the second method.

2. The garbage collection method of claim 1, wherein the first method comprises selecting the target segment in consideration of the number of valid data blocks included in each of the used segments and an entry time of the valid data blocks.

3. The garbage collection method of claim 2, wherein the first method comprises a cost-benefit method.

4. The garbage collection method of claim 2, wherein the second method comprises moving valid data blocks included in the selected target segment to a used segment included in the first region.

5. The garbage collection method of claim 1, wherein the third method comprises selecting the target segment in consideration of only the number of valid data blocks included in each of the used segments.

6. The garbage collection method of claim 5, wherein the third method includes selecting a used segment having the smallest number of valid data blocks among the plurality of used segments as the target segment.

7. The garbage collection method of claim 5, wherein the third method includes an economical method.

8. The garbage collection method of claim 5, wherein when the selected target segment is included in the fourth region, the fourth method comprises moving valid data blocks included in the selected target segment in the fourth region to a used segment included in the third region, and
    when the selected target segment is included in one of the first to third regions, the fourth method comprises moving valid data blocks included in the selected target segment in the one of the first to third regions to a used segment included in the first region.

9. The garbage collection method of claim 5, wherein when the selected target segment is included in the fourth region, the fourth method comprises moving valid data blocks included in the selected target segment in the fourth region to a used segment included in the third region,
    when the selected target segment is included in the third region, the fourth method comprises moving valid data blocks included in the selected target segment in the third region to a used segment included in the second region, and
    when the selected target segment is included in one of the first and second regions, the fourth method comprises moving valid data blocks included in the selected target segment in the one of the first and second regions to a used segment included in the first region.

10. The garbage collection method of claim 1, wherein when first data is newly entered to the memory area, the first data is entered as a valid data block of a used segment included in the second region; when the first data is re-entered to the memory area, the first data is entered as a valid data block of a used segment included in the third region and the valid data block associated with the first data of the used segment included in the second region is changed to an invalid data block; and when the used segment including the valid data block included in the third region and associated with the first data is selected as the target segment, the valid data block associated with the first data included in the target segment is moved to a used segment included in the first region.

11. The garbage collection method of claim 10, wherein when the first data is re-entered to the memory area, the first data is entered as a valid data block of a used segment included in the fourth region and the valid data block associated with the first data of the used segment included in the first region is changed to an invalid data block.

12. The garbage collection method of claim 1, wherein when first data is newly entered to the memory area, the first data is entered as a valid data block of a used segment included in the second region; when the first data is re-entered to the memory area, the first data is entered as a valid data block of a used segment included in the third region and the valid data block associated with the first data of the used segment included in the second region is changed to an invalid data block; when the first data is re-entered to the memory area, the first data is entered as a valid data block of a used segment included in the fourth region and the valid data block associated with the first data of the used segment included in the third region is changed to an invalid data block; and when the used segment including the valid data block included in the fourth region and associated with the first data is selected as the target segment, the valid data block associated with the first data included in the target segment is moved to a used segment included in the first region.

13. The garbage collection method of claim 12, wherein when the first data is re-entered to the memory area, the first data is entered as a valid data block of a used segment included in the fourth region and the valid data block associated with the first data of the used segment included in the first region is changed to an invalid data block.

14. The garbage collection method of claim 1, wherein when first data is newly entered to the memory area, the first data is entered as a valid data block of a used segment included in the second region; when the used segment including the valid data block included in the second region and associated with the first data is selected as the target segment, the valid data block associated with the first data included in the target segment is moved to a used segment included in the first region; when the first data is re-entered to the memory area, the first data is entered as a valid data block of a used segment included in the fourth region and the valid data block associated with the first data of the used segment included in the first region is changed to an invalid data block; and when the used segment including the valid data block included in the fourth region and associated with the first data is selected as the target segment, the valid data block associated with the first data included in the target segment is moved to a used segment included in the third region.

15. A garbage collection method of a nonvolatile memory device comprising a memory area including a plurality of free segments and first to fourth regions having a plurality of used segments, respectively, the method comprising:
when the number of free segments included in the memory area is greater than a predefined value, selecting a target segment from the plurality of used segments in consideration of the number of valid data blocks included in each of the used segments and an entry time of the valid data blocks, and when the number of free segments included in the memory area is less than the predefined value, selecting a used segment having the smallest number of valid data blocks among the plurality of used segments as the target segment, without consideration of the entry time of the valid data blocks;
moving a valid data block included in the selected target segment to a used segment included in the first region; and
erasing data of all data blocks included in the selected target segment and making the selected target segment into a free segment.

16. The memory system of claim 15, wherein selecting the target segment from the plurality of used segments in consideration of the number of valid data blocks included in each of the used segments and the entry time of the valid data blocks is performed according to the following equation:

$$\frac{((1-u) \times \text{Age})}{(1+u)}$$

wherein u denotes the number of valid data blocks included in each used segment and Age denotes the entry time of the valid data blocks included in each used segment.

17. A memory system, comprising:
a nonvolatile memory device comprising a memory area, the memory area comprising a plurality of free segments and a plurality of regions each having a plurality of used segments; and
a controller configured to determine whether the number of free segments included in the memory area is greater than a predefined value, to select a target segment from the plurality of used segments in one of the plurality of regions based on the determination, to move a valid data block included in the selected target segment to a used segment included in another one of the plurality of regions, and to erase data of all data blocks included in the selected target segment,
wherein when the number of free segments included in the memory area is greater than the predefined value, the target segment is selected in consideration of the number of valid data blocks included in each of the plurality of used segments in the one of the plurality of regions and an entry time of the valid data blocks, and when the number of free segments included in the memory area is less than the predefined value, the target segment is selected in consideration of the number of valid data blocks included in each of the plurality of used segments in the one of the plurality of regions and an entry time of the valid data blocks, without consideration of the entry time of the valid data blocks.

18. The memory system of claim 17, wherein the controller is further configured to make the selected target segment into a free segment after erasing the data blocks included in the selected target segment.

19. The memory system of claim 18, wherein the one of the plurality of regions including the selected target segment is a region in which data is most frequently written from among the plurality of regions.

20. The memory system of claim 19, wherein data in the another one of the plurality of regions is redistributed to the region in which data is most frequently written.

* * * * *